United States Patent
Narusawa (10) Patent No.: US 6,381,448 B2
(45) Date of Patent: *Apr. 30, 2002

(54) SELECTIVE CALL RADIO RECEIVER WITH MAIL DROP MESSAGE DISPLAY FUNCTION

(75) Inventor: Hideki Narusawa, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/233,538

(22) Filed: Jan. 20, 1999

(30) Foreign Application Priority Data

Feb. 10, 1998 (JP) ............................................ 10-044465

(51) Int. Cl.[7] .............................................. H04B 17/02
(52) U.S. Cl. ........................ 455/133; 455/566; 340/7.52
(58) Field of Search .............................. 455/31.1, 31.2, 455/31.3, 32.1, 38.1, 412, 38.2, 566, 422, 133; 340/825.44, 7.52; 379/57, 59

(56) References Cited

U.S. PATENT DOCUMENTS

| | | | | |
|---|---|---|---|---|
| 5,032,832 A | * | 7/1991 | DeLuce ...................... | 455/343 |
| 5,604,491 A | * | 2/1997 | Coonley et al. ............ | 455/38.2 |
| 5,633,918 A | * | 5/1997 | Mankovitz .................. | 379/110 |
| 6,032,024 A | * | 6/1997 | Makino ...................... | 455/38.4 |
| 5,694,120 A | * | 12/1997 | Indekeu et al. ............ | 455/38.1 |
| 5,774,061 A | * | 6/1998 | Kudoh .................. | 340/825.44 |
| 5,966,113 A | * | 10/1999 | Hidaka et al. .......... | 340/825.44 |
| 6,060,998 A | * | 5/2000 | Miyashita .............. | 340/825.44 |
| 6,070,069 A | * | 5/2000 | Yoshinaga ................. | 455/31.2 |
| 6,131,046 A | * | 10/2000 | Sano et al. ................. | 455/566 |
| 6,256,516 B1 | * | 7/2001 | Wagner et al. .............. | 455/565 |

FOREIGN PATENT DOCUMENTS

| | | | |
|---|---|---|---|
| JP | 57-7247 | | 6/1955 |
| JP | 62-189827 | | 8/1987 |
| JP | 62-208723 | | 9/1987 |
| JP | 63-111736 | | 5/1988 |
| JP | 63-124631 | | 5/1988 |
| JP | 63-234736 | | 9/1988 |
| JP | 1-284029 | | 11/1989 |
| JP | 2-64249 | | 5/1990 |
| JP | 2-90559 | | 7/1990 |
| JP | 2-250540 | | 10/1990 |
| JP | 2-266620 | | 10/1990 |
| JP | 3-89639 | | 4/1991 |
| JP | 3-108822 | | 5/1991 |
| JP | 3-175827 | | 7/1991 |
| JP | 3-273716 | | 12/1991 |
| JP | 3-277025 | | 12/1991 |
| JP | 3-283923 | | 12/1991 |
| JP | 4-227345 | | 8/1992 |
| JP | 4-253428 | | 9/1992 |
| JP | 6-318899 | | 11/1994 |
| JP | 7-123457 | | 5/1995 |
| JP | 08305988 A | * | 11/1996 |
| JP | 9-51566 | | 2/1997 |
| JP | 09205665 A | * | 8/1997 |
| JP | 9-331561 | | 12/1997 |

* cited by examiner

Primary Examiner—William Trost
Assistant Examiner—Tilahun Gesesse
(74) Attorney, Agent, or Firm—Scully, Scott, Murphy & Presser (57) ABSTRACT

A selective call radio apparatus includes an operation unit, a display unit, and a message storage unit for storing mail drop messages for respective mail drop selective call numbers. A control unit selects one of the mail drop selective call numbers through an operation of the operation unit, and reads out one of the mail drop messages corresponding to the specified mail drop selective call number from the message storage unit. Also, the control unit controls the display unit to display the read mail drop message based on an elapsed time from reception of the mail drop message.

21 Claims, 9 Drawing Sheets

| SELECTIVE CALL NO. | TIME OVER DISPLAY FLAG | RECEIVED MESSAGE |
|---|---|---|
| INDIVIDUAL SELECTIVE CALL NO. 1 | 0 (FIXED) | MESSAGE 2, 3, 4 AND 6 |
| INDIVIDUAL SELECTIVE CALL NO. 2 | 0 (FIXED) | MESSAGE 1 AND 5 |
| MAIL DROP SELECTIVE CALL NO. 1 | 1 | MAIL DROP MESSAGE 1 |
| MAIL DROP SELECTIVE CALL NO. 2 | 0 | MAIL DROP MESSAGE 5 |

0: BEFORE SET TIME
1: AFTER SET TIME

| | SELECTIVE CALL NO. | UPDATE TIME | RECEIVED MESSAGE |
|---|---|---|---|
| FIRST REGION | MAIL DROP SELECTIVE CALL NO. 1 | AA:BB | MAIL DROP MESSAGE 1 |
| | MAIL DROP SELECTIVE CALL NO. 2 | CC:DD | MAIL DROP MESSAGE 3 |
| | SELECTIVE CALL NO. | | RECEIVED MESSAGE |
| SECOND REGION | INDIVIDUAL SELECTIVE CALL NO. 1 | | MESSAGES 2, 3, 4 AND 6 |
| | INDIVIDUAL SELECTIVE CALL NO. 2 | | MESSAGES 2 AND 3 |

SELECTIVE CALL RADIO RECEIVER WITH MAIL DROP MESSAGE DISPLAY FUNCTION

BACKGROUND OF THE INVENTION

1. Field of the Invention

The present invention relates to a selective call radio receiver, and more particularly to a selective call radio receiver which can display a message using a mail drop function.

2. Description of the Related Art

Conventionally, a selective call radio system is known in which a message is inputted using a telephone and transmitted to a selective call radio receiver. In the selective call radio system, the inputted message is sent from the telephone through a telephone line to a base station. Then, the message is transmitted to the selective call radio receiver using electromagnetic wave from the base station. The message is received by the selective call radio receiver and displayed on a display unit.

In such a recent selective call radio receiver, a built-in memory capacity is increased and a display function is enriched. Accordingly, the selective call radio receiver can receive and display a text message composed of alphanumeric letters, Kana letters and Kanji letters in addition to display of destination telephone numbers.

Also, the service of the selective call radio system has been widened to new service in which various data such as stock market information and weather forecast information are transmitted for a predetermined time, in addition to the above conventional service such as the transfer of an individual message. The selective call radio receiver has the so-called mail drop function to receive such new service. Hereinafter, massages such as stock market information and weather forecast information which are transmitted for a predetermined time are called "mail drop messages".

In the mail drop function, a mail drop message and a mail drop selective call number allocated to the mail drop message are received from a base station. The received mail drop message is overwritten in a memory area of the selective call radio receiver which corresponds to the received mail drop selective call number. According to the mail drop function, the latest mail drop message is always stored in the memory area which corresponds to the mail drop selective call number. The user can always see the latest mail drop message.

There is a case that a mail drop message is sent, when the user of the selective call radio receiver is in the place such as inside of a tunnel and underground in which electromagnetic wave can not be received. In such a case, the mail drop message stored in the selective call radio receiver cannot be received and updated to the latest message.

Also, in the mail drop function in the conventional selective call radio receiver, the stored mail drop message is merely displayed. Instead, the mail drop message is displayed together with the time at which the mail drop message has been received. Therefore, whether the displayed mail drop message is new or old can not be determined so that the user would feel complicated.

By the way, a display pager is described in Japanese Laid Open Patent Application (JP-A-Heisei 3-277025). In this reference, a timer starts to count time each time a message to the display pager is received, and the timer is stopped when the message is displayed on a display unit. When a previously set time lapses without the display of the message, a time-out signal is outputted from the timer. An alarm is generated in response to the time-out signal, and the message is also displayed on the display unit in response to the time-out signal.

However, in the display pager, the user is not possible to know whether or not the displayed message is a new message or an old message, when stored messages are read out and displayed.

Besides, a character message paging system is described in Japanese Laid Open Patent Application (JP-A-Heisei 2-250540). In this reference, character messages are inputted from subscriber terminals and stored with serial numbers in a message storage unit of a paging switch for every destination pager. A count value indicating the number of character messages stored in the message storage unit is sent to a transmission unit for every predetermined time. A user of a pager requests retransmission unit to retransmit the character messages. The pager compares the number of received character messages and the counter value transmitted from the paging switch for every predetermined time and output an alarm when it is determined that the number of received character messages is not coincident with the counter value.

Also, a message pager with a call code setting key is described in Japanese Laid Open Patent Application (JP-A-Heisei 2-266620). In this reference, a pager is composed of a data receiving section, an input section, a storage section, a comparing section, a reception data storage section, a display section, a buzzer, and a control section. The data receiving section receives data transmitted through a radio data link. A call code, a priority level and a buzzer driving data are inputted from the input section. The storage section stores data from the input section. The comparing section compares the call code of received data by the receiving section and the call code stored in the storage section. The reception data storage section stores a reception data in correspondence to the call code of the reception data, and the display section displays the reception data. The control section reads out from the buzzer drive data and the priority level from the storage section, and performs one of the storage of the reception data into the reception data storage section and display of the reception data on the display section in accordance with the priority level. Also, the control section drives the buzzer in accordance with the buzzer drive data.

Also, a selective call radio receiver with a display function is described in Japanese Laid Open Patent Application (JP-A-Heisei 3-273716). In this reference, the selective call radio receiver has a plurality of call numbers peculiar to the receiver. The selective call radio receiver has a function in which the receiver is automatically controlled such that character display data transmitted from a base station in accordance with given regulation are held in accordance with the regulation, when being called using the call numbers more than a predetermined number. Also, the selective call radio receiver has a function to perform a call originating operation in addition to the storage of the character display data. Further, the selective call radio receiver has a function to display the character display data.

Also, a selective call radio receiver is described in Japanese Laid Open Patent Application (JP-A-Heisei 4-227345). In this reference, the selective call radio receiver has a first peculiar call number (a first address) for a message data and a second peculiar call number (a second address) for a time data. A radio section is supplied with power for a time for which a data for the peculiar call number is received. The time data is received only when a second call flag is set to "1". Thus, when the time data is not necessary, the time data is not received, resulting in saving of power consumption.

SUMMARY OF THE INVENTION

The present invention is accomplished to solve the above-mentioned problems. Therefore, an object of the present invention is to provide a selective call radio receiver, in which it is possible to distinct whether a displayed mail drop message is new or old.

Also, another object of the present invention is to provide a selective call radio receiver, in which it is possible to distinct a mail drop message that a predetermined time has elapsed after the mail drop message is received.

In order to achieve an aspect of the present invention, a selective call radio apparatus includes an operation unit, a display unit, and a message storage unit for storing mail drop messages for respective mail drop selective call numbers. A control unit selects one of the mail drop selective call numbers through an operation of the operation unit, and reads out one of the mail drop messages corresponding to the specified mail drop selective call number from the message storage unit. Also, the control unit controls the display unit to display the read mail drop message based on an elapsed time from reception of the mail drop message.

The control unit may compare a present time and a reception time of the mail drop message, and may control the display unit to display the mail drop message corresponding to the specified mail drop selective call number based on the comparing result. In this case, the control unit stores the mail drop message in the message storage unit together with the reception time.

Also, the control unit may refer to a flag for the mail drop message. The flag indicates whether a predetermined time has elapsed after the mail drop message is received. The control unit may control the display unit to display the mail drop message corresponding to the specified mail drop selective call number based on the referring result. In this case, the control unit stores the mail drop message in the message storage unit together with the flag. The control unit initializes the flag when storing the mail drop message in the message storage unit, and sets the flag when the predetermined time has elapsed after the mail drop message is received. In this case, the selective call radio apparatus may further include a timer counting a time after the reception of the mail drop message.

The control unit may control the display unit to display the mail drop message corresponding to the specified mail drop selective call number in a predetermined display attribute when a predetermined time has elapsed after the reception of the mail drop message. In this case, the predetermined display attribute is a color inversion or addition of a special symbol. Also, the predetermined time may be variable.

In order to achieve another aspect of the present invention, a method of displaying a message, includes the steps of:
specifying one of mail drop selective call numbers; and
displaying a mail drop message corresponding to the specified mail drop selective call number based on an elapsed time from reception of the mail drop message.

DESCRIPTION OF THE PREFERRED EMBODIMENTS

Next, the selective call radio receiver of the present invention will be described below in detail with reference to the attached drawings.

Figure 1:
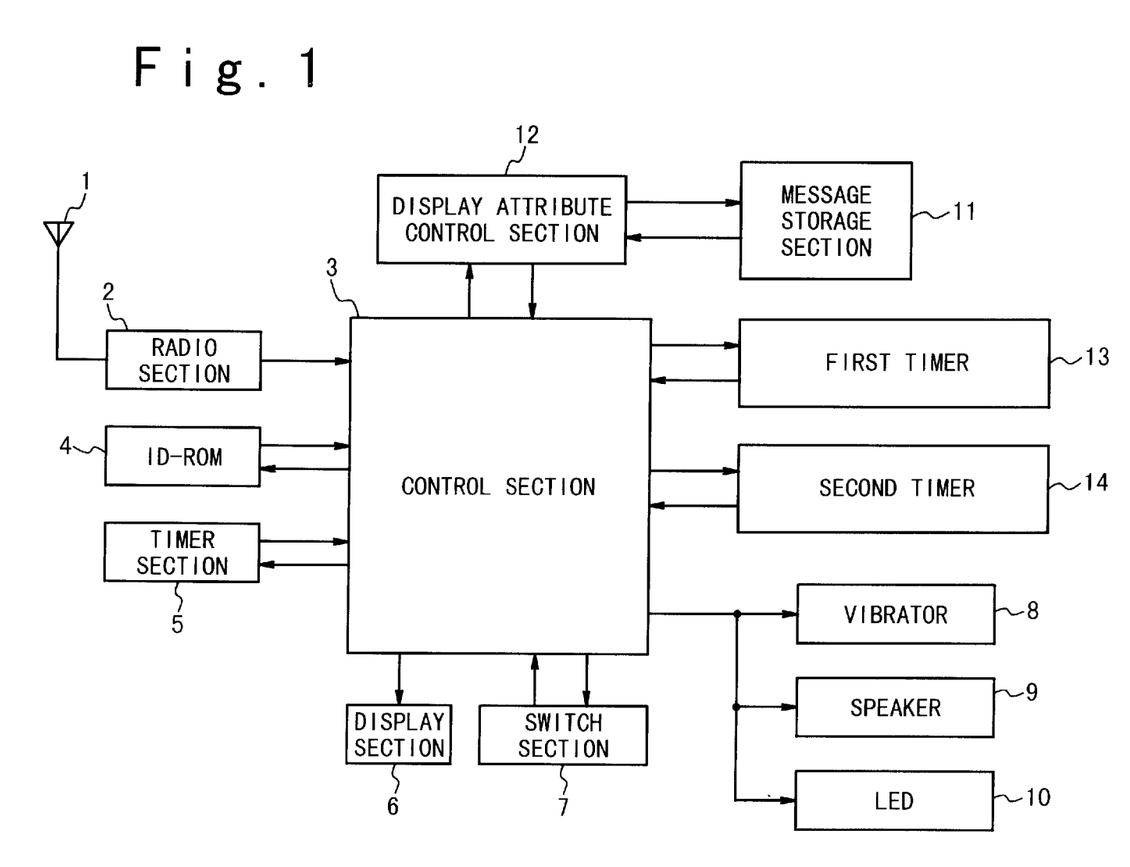
FIG. 1 is a block diagram illustrating the structure of a selective call radio receiver according to a first embodiment of the present invention.

FIG. 1 is a block diagram illustrating the structure of the selective call radio receiver according to the first embodiment of the present invention. Referring to FIG. 1, the selective call radio receiver is composed of an antenna 1, a radio section 2, a control section 3, an ID-ROM 4, a timer section 5, a display section 6, a switch section 7, a vibrator 8, a speaker 9, an LED 10, a message storage section 11, a display attribute control section 12, a first timer 13 for a mail drop selective call number (1), and a second timer 14 for a mail drop selective call number (2).

The radio section 2 demodulates a radio signal received by the antenna 1 to supply to the control section 3.

The ID-ROM 4 stores individual selective call numbers for individual messages, and mail drop selective call numbers (1) and (2). Also, the ID-ROM 4 stores a setting time and a display attribute for each of the mail drop selective call numbers. The setting time is used to indicate whether each mail drop message is new or old. Also, the display attribute is used to indicate the display attribute when each mail drop message is displayed.

The timer section 5 generates and supplies present time data to the control section 3. Also, the time of the timer section 5 is set in accordance with a time setting data from the control section 3.

The display section 6 displays a message and a time in accordance with a display instruction from the control section 3.

The switch section 7 is provided with various kinds of key switches used to control the selective call radio receiver. The user operates the switch section 7 to instruct resetting of ringing sound of the speaker 9, switching of a display, correction of the present time, and read of messages stored in the message storage section 11. An instruction corresponding to the operation of the switch section 7 is sent to the control section 3.

The vibrator 8 notifies the arrival of a message in vibration. The speaker 9 notifies the arrival of the message in sound. The LED 10 is used to notify the arrival of the message by light.

Figure 2:
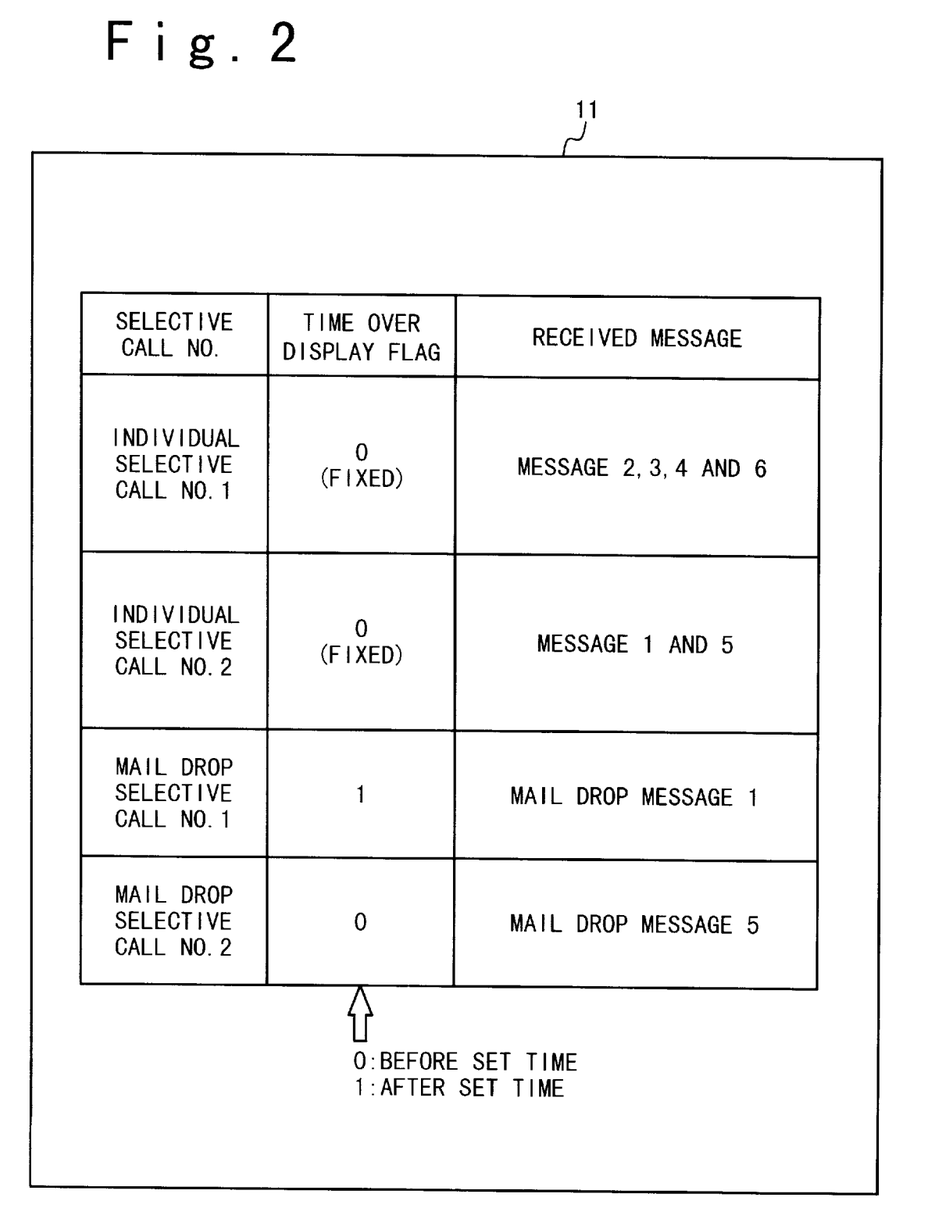
FIG. 2 is a diagram illustrating the structure of a message storage section of the selective call radio receiver according to the first embodiment of the present invention.

The message storage section 11 stores received messages. As shown in FIG. 2, the message storage section 11 has two regions for individual selective call numbers (1) and (2) for individual or usual messages, and two regions for mail drop selective call numbers (1) and (2) for mail drop messages. Each of the four regions is composed of a field for storing the corresponding selective called number, a field for storing a time over flag which indicates whether a predetermined time has elapsed after the corresponding message is received, and a field for storing the received messages. The time over display flags for the individual messages are previously fixed to "0". The time over display flag for each mail drop message is set to "0" when the mail drop message is received and updated to "1" when the predetermined time has elapsed after the reception.

It should be noted that it is assumed for simple description in the first embodiment that the two mail drop selective call numbers for mail drop messages and two individual selective call numbers for individual messages are used. However, the number of selective call numbers is not limited to these numbers.

The setting time stored in the ID-ROM 4 for the mail drop selective call number (1) is set to the first timer 13 as an initial value by the control section 3. The first timer 1 starts to count down from the initial value when a mail drop message having selective call number (1) is received. Then, when the value of the first timer 13 reaches 0, the first timer 13 generates a first time over signal to the control section 3.

The setting time stored in the ID-ROM 4 for the mail drop selective call number (2) is set to the second timer 14 as an initial value by the control section 3. The second timer 14 starts to count down from the initial value when a mail drop message having selective call number (2) is received. Then, when the value of the second timer 14 reaches "0", the second timer 14 generates a second time over signal to the control section 3.

The control section 3 generates first and second flag switch signals in response to the first and second time over signals from the first and second timers 13 and 14, respectively.

The display attribute control section 12 receives messages from the control section 3 and stores in the message storage fields based on the selective call numbers of the messages, respectively. At this time, the display attribute control section 12 resets the time over display flag corresponding to the received message to "0". Also, the display attribute control section 12 sets the time over display flags to "1" in response to the first and second flag switch signals from the control section 3, respectively. When a display instruction is inputted from the switch section 7, the control section 3 generates a message display instruction to the display attribute control section 12. In response to the message display instruction, the display attribute control section 12 reads out and sends the message and the time over display flag from the message storage section 11 to the control section 3. The control section 3 reads out the display attribute from the ID-ROM 4 based on the read out the time over display flag and controls the display section 6 to display the message in the read display attribute. In this embodiment, the message that the setting time has elapsed and the time over flag for the message is set to "1", is displayed in a color inversion display attribute. That is, the message is displayed in a white color on a black background while an individual or usual message is displayed in a black color on a white background.

Figure 3:
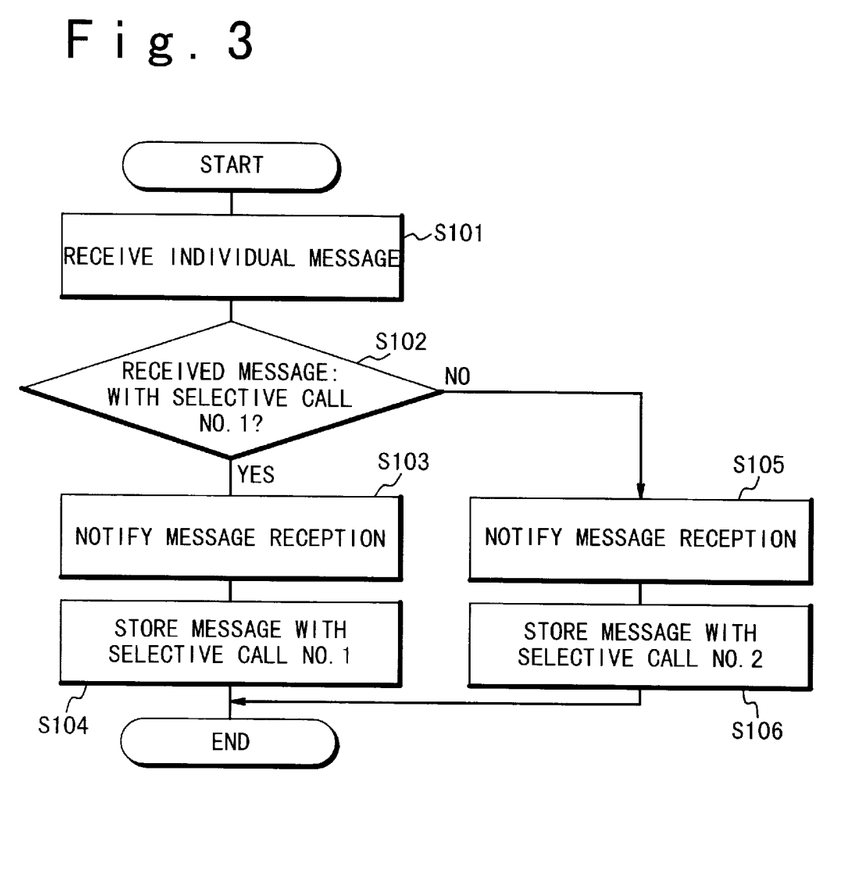
FIG. 3 is a flow chart to explain an individual message receiving operation of the selective call radio receiver according to the first embodiment of the present invention.
Figure 4:
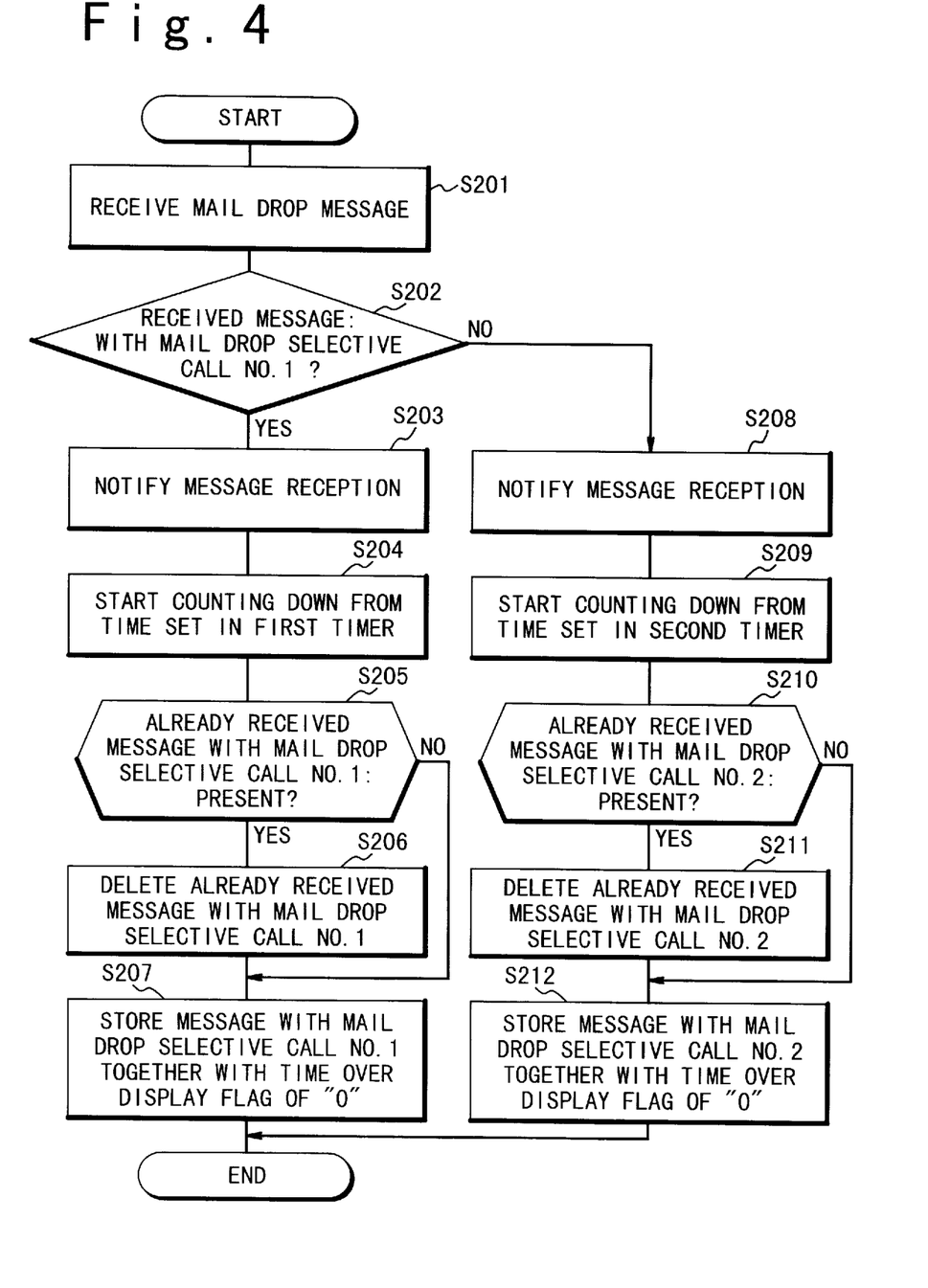
FIG. 4 is a flow chart to explain a mail drop message receiving operation of the selective call radio receiver according to the first embodiment of the present invention.

Next, message receiving operations of the selective call radio receiver according to the first embodiment will be described below with reference to a flow chart shown in FIGS. 3 and 4. FIG. 3 shows the message receiving operation when an individual message is received. FIG. 4 shows the message receiving operation when a mail drop message is received.

First, referring to FIG. 3, at a step S101, a radio signal is received by the antenna 1 and is demodulated by the radio section 2. The demodulated signal is sent to the control section 3.

At a step S102, the control section 3 extracts a selective called number from the demodulation signal and compares the selective call number extracted from the demodulation signal with each of the selective call numbers which are stored in the ID-ROM 4. When the extracted selective call number is coincident with the individual selective call number (1) for the individual message, a step S103 is executed. Also, when the extracted selective call number is coincident with the individual selective call number (2) for the individual message, a step S105 is executed.

At the step S103, the control section 3 controls at least one of the vibrator 8, the speaker 9 and the LED 10 to notify the reception of the message to the user. Subsequently, at a step S104, the control section 3 extracts a message having the individual selective call number (1) from the demodulation signal, and sends to the display attribute control section 12. The display attribute control section 12 stores the extracted message in the message storage field of the message storage section 11 for the individual selective call number (1).

At the step S105, the control section 3 controls at least one of the vibrator 8, the speaker 9 and the LED 10 to notify the reception of the message to the user. Subsequently, at a step S106, the control section 3 extracts a message having the individual selective call number (2) from the demodulation signal, and sends to the display attribute control section 12. The display attribute control section 12 stores the extracted message in the message storage field of the message storage section 11 for the individual selective call number (2).

Next, a switching operation of the time over display flag will be described with reference to FIGS. 1, 2 and 4.

As the time over display flags corresponding to the individual selective call numbers for individual messages, "0" are fixedly stored. On the other hand, as the time over display flag corresponding to the mail drop selective call numbers for the mail drop messages, "0" are stored, each time the mail drop message is received.

The first and second timers 13 and 14 generate the first and second time over signals when the setting times have elapsed after the mail drop messages are received, respectively. The control section 3 controls the display attribute control section 12 to update the time over display flags from "0" to "1" in response to the first and second time over signals, respectively.

Next, the operation when the message having one of the selective call numbers for mail drop messages is received will be described with reference to the flow chart shown in FIG. 4.

First, referring to FIG. 4, at a step S201, a radio signal is received by the antenna 1 and is demodulated by the radio section 2. The demodulated signal is sent to the control section 3. This operation is the same as that of the step S101 of the flow chart shown in FIG. 3.

At a step S202, the control section 3 extracts a selective called number from the demodulation signal and compares the selective call number extracted from the demodulation with each of the mail drop selective call numbers which are stored in the ID-ROM 4. When the extracted selective call number is coincident with the mail drop selective call number (1), a step S203 is executed. Also, when the extracted selective call number is coincident with the mail drop selective call number (2), a step S208 is executed.

At the step S203, the control section 3 controls at least one of the vibrator 8, the speaker 9 and the LED 10 to notify the reception of the message to the user. Subsequently, at a step S204, the control section 3 reads out the setting time from the ID-ROM 4 to set to the first timer 13. Then, the first timer 13 starts a count down operation from the setting time.

Then, at a step S205, the control section 3 inquires to the display attribute control section 12 whether there is an already stored mail drop message having the mail drop selective call number (1). The display attribute control section 12 refers to the message storage section 11 to check whether there is an already stored mail drop message having the mail drop selective call number (1). When it is determined that there is no mail drop message having the mail drop selective call number (1) in the message storage section 11, the display attribute control section 12 notifies this to the control section 3 without any operation. On the other hand, when it is determined that there is a mail drop message having the mail drop selective call number (1) in the message storage section 11, the display attribute control section 12 deletes the stored mail drop message at a step S206 and notifies this to the control section 3.

Subsequently, at a step S207, the control section 3 extracts a message having the mail drop selective call number (1) from the demodulation signal, to send to the display attribute control section 12. The display attribute control section 12 stores the extracted mail drop message in the message storage field of the message storage section 11 for the mail drop selective call number (1). At the same time, the display attribute control section 12 resets the time over display flag for the stored mail drop message to 0.

Thereafter, when the timer value of the first timer 13 reaches "0", the first timer 13 generate a first timer over signal to the control section 3. The control section 3 outputs a first flag switch signal to the display attribute control section 12. The display attribute control section 12 switches the time over display flag from "0" to "1" in response to the first flag switch signal supplied from the control section 3.

At the step S208, the control section 3 controls at least one of the vibrator 8, the speaker 9 and the LED 10 to notify the reception of the message to the user. Subsequently, at a step S209, the control section 3 reads out the setting time from the ID-ROM 4 to set to the second timer 14. Then, the second timer 14 starts a count down operation from the setting time.

Then, at a step S210, the control section 3 inquires to the display attribute control section 12 whether there is an already stored mail drop message having the mail drop selective call number (2). The display attribute control section 12 refers to the message storage section 11 to check whether there is an already stored mail drop message having the mail drop selective call number (2). When it is determined that there is no mail drop message having the mail drop selective call number (2) in the message storage section 11, the display attribute control section 12 notifies this to the control section 3 without any operation. On the other hand, when it is determined that there is a mail drop message having the mail drop selective call number (2) in the message storage section 11, the display attribute control section 12 deletes the mail drop message at a step S211 and notifies this to the control section 3.

Subsequently, at a step S207, the control section 3 extracts a message having the mail drop selective call number (2) from the demodulation signal, to send to the display attribute control section 12. The display attribute control section 12 stores the extracted mail drop message in the message storage field of the message storage section 11 for the mail drop selective call number (2). At the same time, the display attribute control section 12 resets the time over display flag for the stored mail drop message to "0".

Thereafter, when the timer value of the second timer 14 reaches "0", the second timer 14 generate a second timer over signal to the control section 3. The control section 3 outputs a second flag switch signal to the display attribute control section 12. The display attribute control section 12 switches the time over display flag from "0" to "1" in response to the second flag switch signal supplied from the control section 3.

Figure 5:
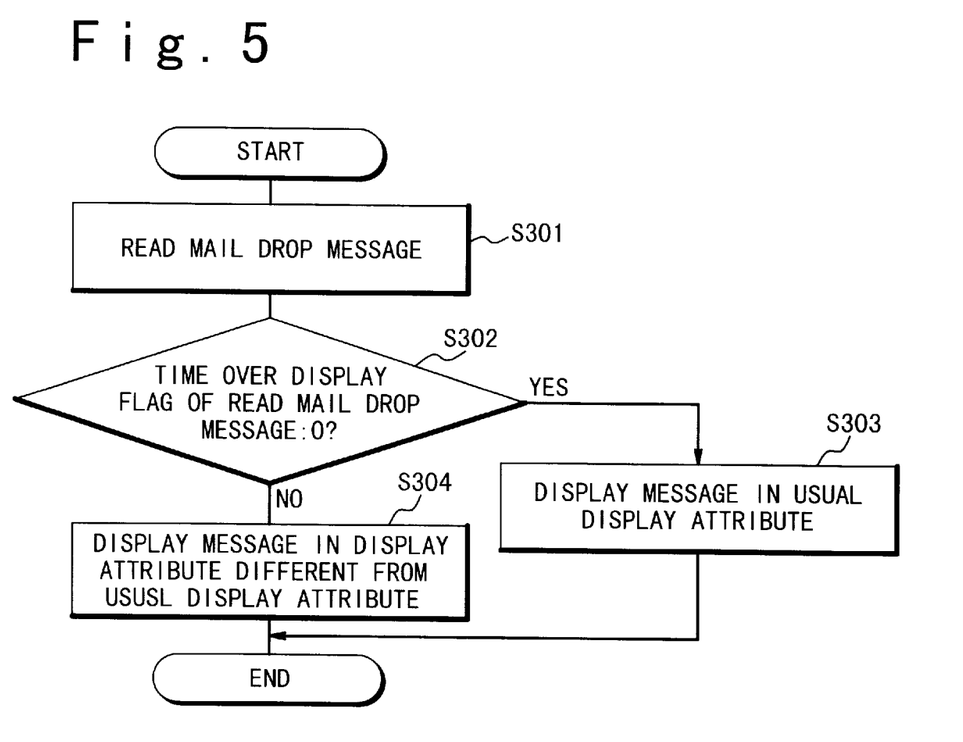
FIG. 5 is a flow chart to explain a mail drop message displaying operation of the selective call radio receiver according to the first embodiment of the present invention.

Next, the display operation of a message will be described below with reference to FIG. 5.

First, a number designating operation is performed through an operation of the switch section 7 to designate one of the selective call numbers. The control section 3 recognizes the designated selective called number through the number designating operation and sends it to the display attribute control section 12. Then, when a read operation of a mail drop message through the switch section 7 is performed, the control section 3 supplies a read instruction corresponding to the read operation to the display attribute control section 12. The display attribute control section 12 reads out the mail drop message from the message storage section 11 together with the time over display flag in response to the read instruction at a step S301. At this time, the display attribute control section 12 determines whether or not the time over display flag of the read mail drop message is "0" at a step S302. When the time over display flag is "0", the display attribute control section 12 outputs a normal display indication to the control section 3. On the other hand, when the time over display flag is "1", the display attribute control section 12 outputs an inversion display indication to the control section 3.

At a step S304, the control section 3 reads out the color inversion display attribute as a time-over display attribute for the mail drop selective call number (1) from the ID-ROM 4 to send the mail drop message with the read display attribute to the display section 6 in response to the inversion display indication. Thus, the mail drop message that the setting time has elapsed is displayed in the color inversion display attribute.

On the other hand, when that the time over display flag is "0" at the above step S302, the read mail drop message is sent to the display section 6 together with the usual display attribute in response to the normal display indication. Thus, the mail drop message before the setting time is displayed in the usual display attribute.

It should be noted that it supposed in the above description that message reception is notified when a mail drop message is received in FIG. 4. However, it is not always necessary to notify the message reception. The setting time and display attribute are stored in the ID-ROM 4 for every selective call number. However, they may be stored in a unit having a storage function other than the ID-ROM 4.

The ID-ROM 4 is a mask ROM. However, a non-volatile memory can be used such as an EEPROM, a flash memory and a ferroelectric memory which can hold data even if the power supply is turned off. In this case, the selective call radio apparatus is formed such that the setting time can be freely changed using the switch section 7. Also, one of various time over display attributes may be selected using the switch section 7.

The above switching of the setting time and the display attribute may be performed based on a set of a peculiar number assigned to the selective call radio receiver and a specific symbol, e.g., "##001". The set may be received from another phone, other than the case of use of the switch section 7. In this case, the control section 3 extracts the set from the demodulation signal supplied from the radio section 2, and then executes a changing program based on the set. Thus, the setting time and the display attribute can be changed or updated.

Also, a terminal for a change data entry is provided for the body of the selective call radio apparatus, and the changing operation may be performed with an exclusive use rewriting equipment or a personal computer.

In FIG. 2, the time over display flag of "0" indicates that the setting time does not yet elapse, and the time over display flag of "1" indicates that the setting time has elapsed. However, any method may be used if it is possible to distinct that the setting time has elapsed.

Also, the selective call radio receiver has the two mail drop selective call numbers. However, the number of mail drop selective call numbers is not limited to two if the selective call number is equal to or more than 1. However, in this case, it is necessary that the number of timers is the same as the number of selective call numbers for the mail drop messages.

Further, the display attribute for the time over display flag of "1" is the color inversion display attribute in the above description. However, a special symbol may be added to the mail drop message as a time over display attribute in place of the color inversion display attribute.

Further, in the first embodiment, the display attribute control section 12 and the control section 3 are separately provided. However, these sections may be provided a single control section.

Next, the selective call radio receiver according to the second embodiment of the present invention will be described below in detail with reference to FIGS. 6, 7, 8 and 9.

In the selective call radio receiver in the above-mentioned first embodiment, the first and second timers 13 and 14 are provided for mail drop selective calling numbers (1) and (2). Also, the time over display flag is provided for every mail drop message. However, in the selective call radio receiver in the second embodiment, the mail drop message is stored together with the storage time. When the display of the mail drop message is required, the storage time and a present time are compared. When the comparing result indicates that the setting time has elapsed, the mail drop message is displayed in the special display attribute such as the color inversion display attribute.

Figure 6:
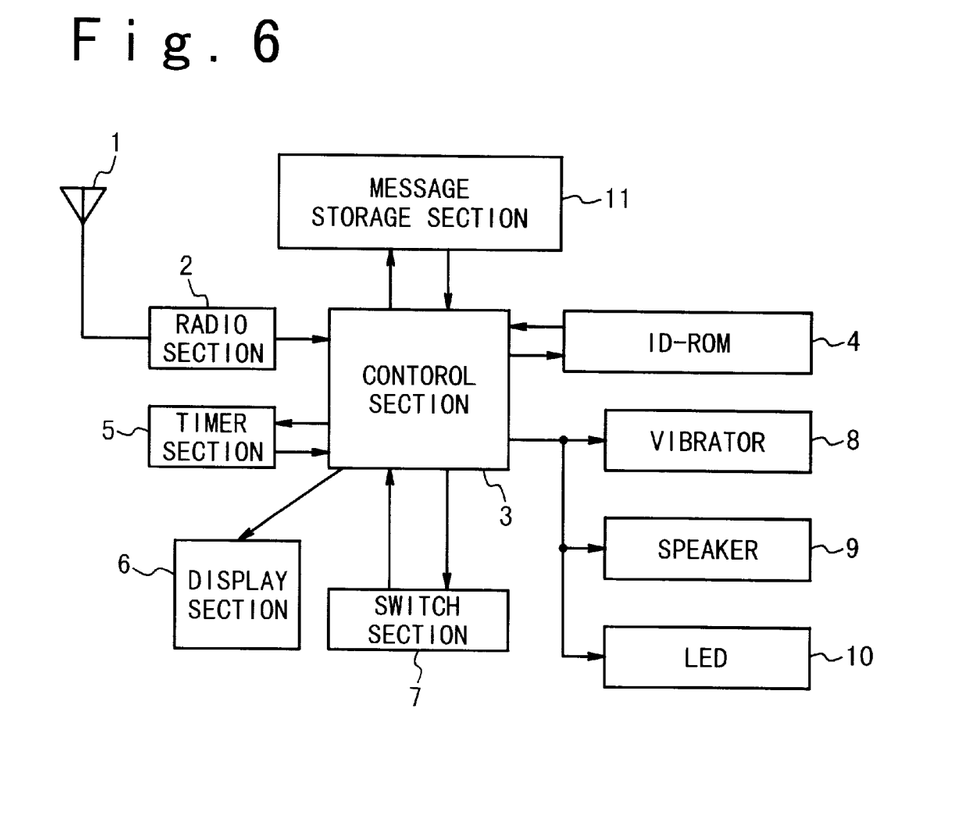
FIG. 6 is a block diagram illustrating the structure of the selective call radio receiver according to a second embodiment of the present invention.

FIG. 6 is a block diagram illustrating the structure of the selective call radio receiver according to the second embodiment of the present invention. Referring to FIG. 6, the selective call radio receiver is composed of an antenna 1, a radio section 2, a control section 3, an ID-ROM 4, a timer section 5, a display section 6, a switch section 7, a vibrator 8, a speaker 9, an LED 10, and a message storage section 11.

The radio section 2 demodulates a radio signal received by the antenna 1 to supply to the control section 3.

The ID-ROM 4 stores individual selective call numbers (1) and (2) for individual messages, and mail drop selective call numbers (1) and (2) for the mail drop messages. Also, the ID-ROM 4 stores a display attribute for each of the mail drop selective call numbers. The display attribute is used to indicate the display attribute when each mail drop message is displayed.

The timer section 5 generates and supplies present time data to the control section 3. Also, the time of the timer section 5 is set in accordance with a time setting data from the control section 3.

The display section 6 and the switch section 7 are same as those of the first embodiment.

The vibrator 8 notifies the arrival of a message in vibration. The speaker 9 notifies the arrival of the message in sound. The LED 10 is used to notify the arrival of the message by light.

Figure 7:
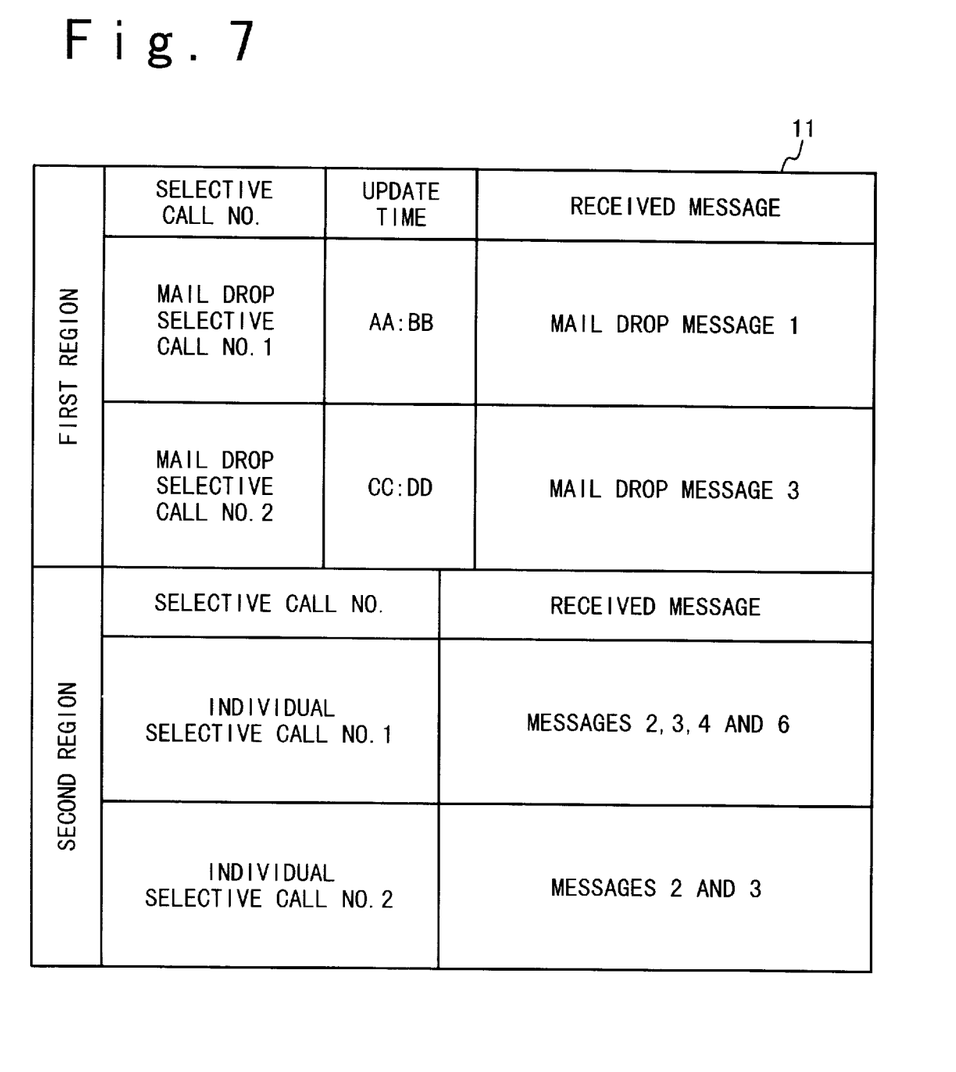
FIG. 7 is a diagram illustrating the structure of a message storage section of the selective call radio receiver according to the second embodiment of the present invention.

The message storage section 11 stores received messages. As shown in FIG. 7, the message storage section 11 has a first region for mail drop messages and a second region for individual messages. In the first regions, two sub-regions are provided for mail drop selective call numbers (1) and (2). Each sub-region is composed of a field for storing the corresponding selective called number, a field for storing a present time, and a field for storing the received mail drop messages. Also, in the second regions, two sub-regions are provided for individual selective call numbers (1) and (2). Each sub-region is composed of a field for storing the corresponding individual selective called number, and a field for storing the received mail drop messages.

It should be noted that it is assumed for simple description in the second embodiment that the two mail drop selective call numbers and two individual selective call numbers are used. However, the number of selective call numbers is not limited to these numbers.

Next, a mail drop message receiving operation of the selective call radio receiver according to the second embodiment will be described below with reference to a flow chart shown in FIG. 8.

Figure 8:
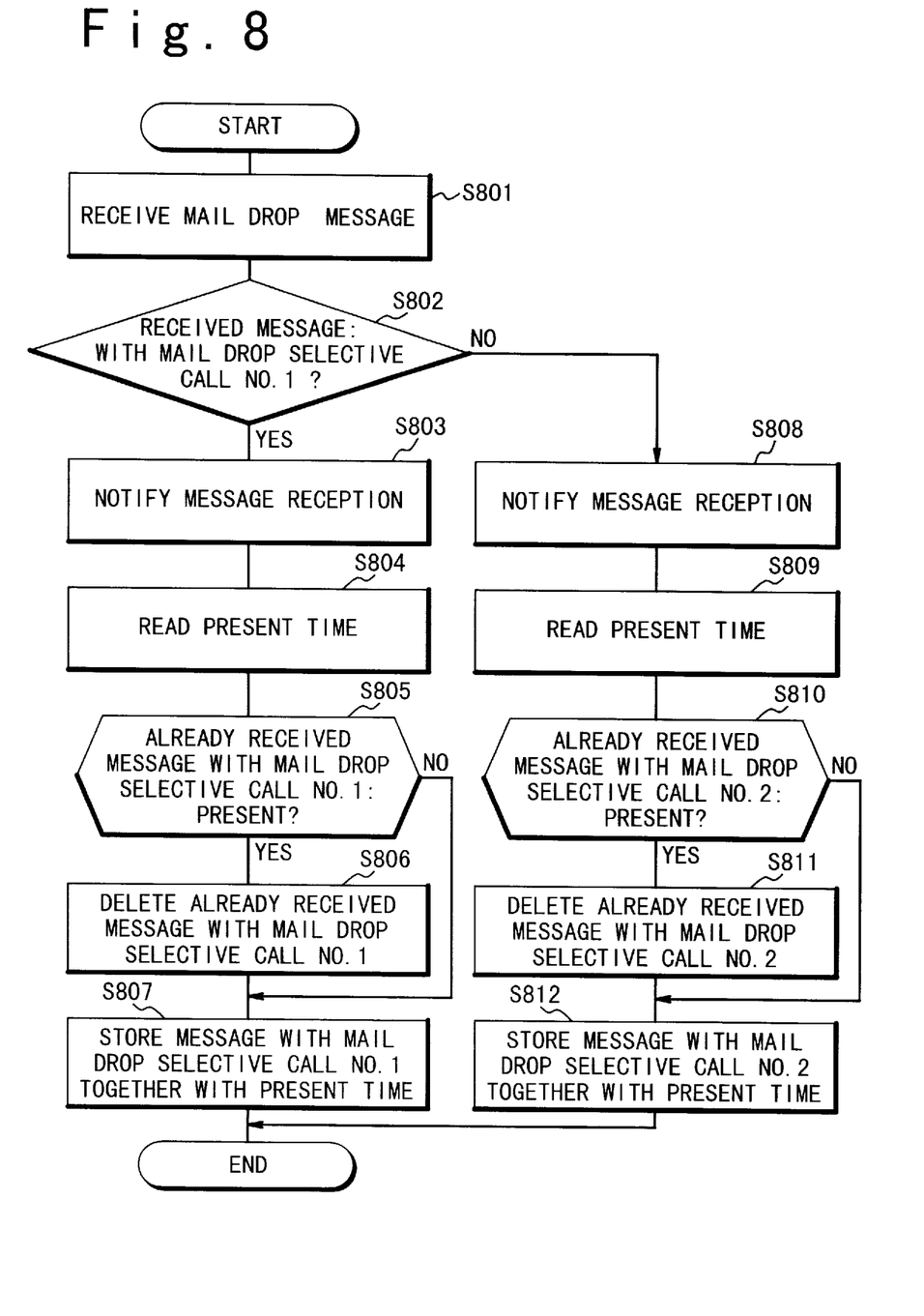
FIG. 8 is a flow chart to explain a mail drop message receiving operation of the selective call radio receiver according to the second embodiment of the present invention.

First, referring to FIG. 8, at a step S801, a radio signal is received by the antenna 1 and is demodulated by the radio section 2. The demodulated signal is sent to the control section 3.

At a step S802, the control section 3 extracts a selective called number from the demodulation signal and compares the selective call number extracted from the demodulation with each of the selective call numbers which are stored in the ID-ROM 4. When the extracted selective call number is coincident with the mail drop selective call number (1), a step S803 is executed. Also, when the extracted selective call number is coincident with the mail drop selective call number (2), a step S808 is executed.

At the step S803, the control section 3 controls at least one of the vibrator 8, the speaker 9 and the LED 10 to notify the reception of the message to the user. Subsequently, at a step S804, the control section 3 reads out the present time from the timer section 5.

Then, at a step S805, the control section 3 determines whether there is an already stored mail drop message having the selective call number (1). When it is determined that there is no mail drop message having the selective call number (1) in the message storage section 11, the control section 3 does not perform any operation. On the other hand, when it is determined that there is a mail drop message having the selective call number (1) in the message storage section 11, the control section 3 deletes the mail drop message at a step S806.

Subsequently, at a step S807, the control section 3 extracts a mail drop message having the selective call number (1) from the demodulation signal, to store the extracted mail drop message in the message storage field of the message storage section 11 for the mail drop selective call number (1). At the same time, the control section 3 stores the read present time as a reception time.

At the step S808, the control section 3 controls at least one of the vibrator 8, the speaker 9 and the LED 10 to notify the reception of the message to the user. Subsequently, at a step S809, the control section 3 reads out the present time from the timer section 5.

Then, at a step S810, the control section 3 determines whether there is an already stored mail drop message having the selective call number (2). When it is determined that there is no mail drop message having the selective call number (2) in the message storage section 11, the control section 3 does not perform any operation. On the other hand, when it is determined that there is a mail drop message having the selective call number (2) in the message storage section 11, the control section 3 deletes the mail drop message at a step S811.

Subsequently, at a step S807, the control section 3 extracts a mail drop message having the selective call number (2) from the demodulation signal, to store the extracted mail drop message in the message storage field of the message storage section 11 for the mail drop selective call number (2). At the same time, the control section 3 stores the read present time as a reception time.

Figure 9:
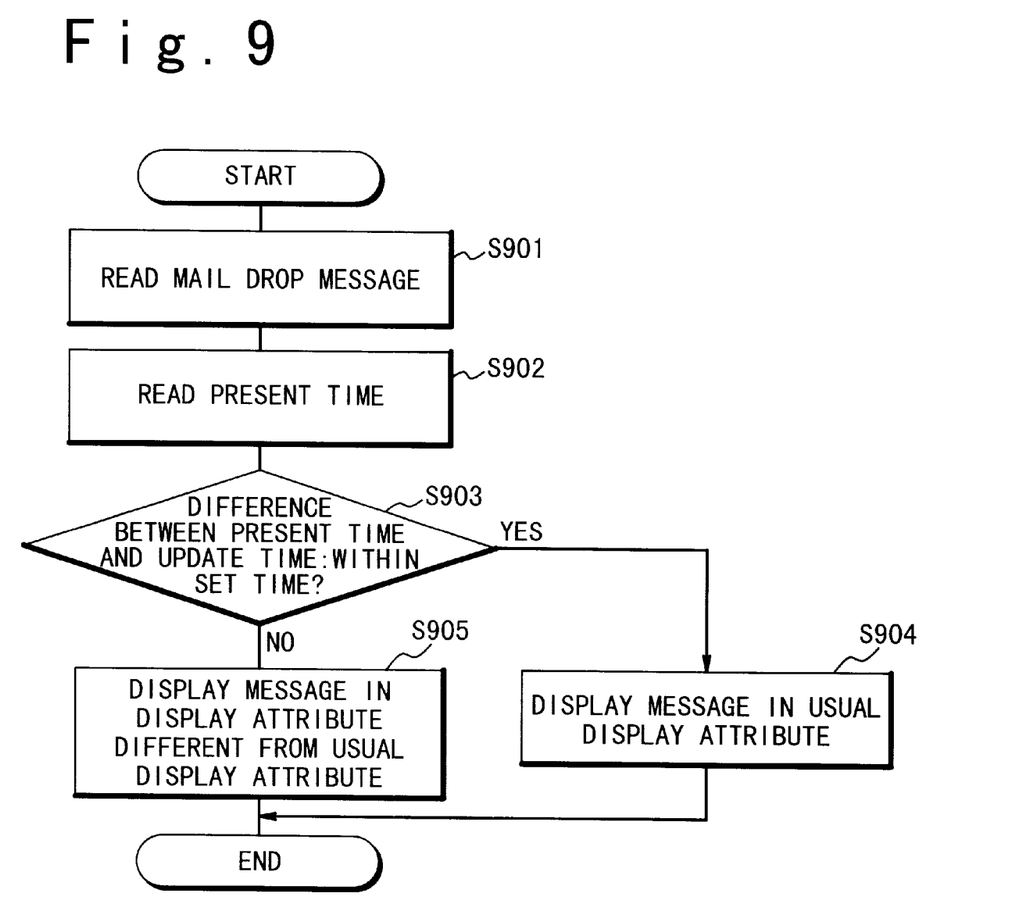
FIG. 9 is a flow chart to explain a mail drop message displaying operation of the selective call radio receiver according to the second embodiment of the present invention.

Next, the display operation of a message will be described below with reference to FIG. 9.

First, a number designating operation to selective call number is performed through the switch section 7. The control section 3 recognizes the designated selective called number through the number designating operation. Then, when a read operation of a mail drop message to the switch section 7 is performed, the control section 3 reads out the mail drop message having the designated selective called number from the message storage section 11 together with the reception time in response to the read instruction at a step S901. Then, at a step S902, the control section 3 reads out the present time from the timer section 5.

Then, the control section 3 compares the read present time and the read reception time to determine whether or not the time difference between the present time and the reception time is within a predetermined time. When the time difference is within the predetermine time, a step S904 is executed. On the other hand, when the time difference is out of the predetermine time, a step S905 is executed.

At the step S904, the control section 3 reads out the usual display attribute from the ID-ROM 4 to send to the display section 6 together with the mail drop message. Thus, the mail drop message is displayed in the usual display attribute such as black color on the white background.

On the other hand, at the step S905, the control section 3 reads out the time over display attribute from the ID-ROM 4 to send to the display section 6 together with the mail drop message. Thus, the mail drop message is displayed in the color inversion display attribute such as while color on the black background.

In case of the first embodiment, the timers 13 and 14 must be provided for the mail drop selective call numbers. Therefore, the hardware quantity increases when the number of mail drop selective call numbers increases. However, according to the second embodiment, although a larger storage area is required, compared with the first embodiment, the message storage section 11 increases only slightly.

As described above, according to the present invention, the mail drop message is displayed on the display section to indicate that the message is not updated over the predetermined time, by use of the time over display attribute. The display attribute is such as color inversion and an alert symbol addition. Therefore, it can be easily recognized that the mess age is not yet updated.

What is claimed is:

1. A selective call radio apparatus, comprising:
   an operation unit;
   a display unit;
   a message storage unit for storing mail drop messages for respective mail drop selective call numbers;
   a control unit for selecting one of said mail drop selective call numbers through an operation of said operation unit, for reading out one of said mail drop messages corresponding to said specified mail drop selective call number from said message storage unit, and for controlling said display unit to display the read mail drop message based on an elapsed time from reception of said mail drop message.

2. A selective call radio apparatus according to claim 1, wherein said control unit compares a present time and a reception time of said mail drop message, and controls said display unit to display said mail drop message corresponding to said specified mail drop selective call number based on the comparing result.

3. A selective call radio apparatus according to claim 2, wherein said control unit stores said mail drop message in said message storage unit together with said reception time.

4. A selective call radio apparatus according to claim 1, wherein said control unit refers to a flag for said mail drop message, wherein said flag indicates whether a predetermined time has elapsed after said mail drop message is received, and said control unit controls said display unit to display said mail drop message corresponding to said specified mail drop selective call number based on the referring result.

5. A selective call radio apparatus according to claim 4, wherein said control unit stores said mail drop message in said message storage unit together with said flag.

6. A selective call radio apparatus according to claim 4, wherein said control unit initializes said flag when storing said mail drop message in said message storage unit, and sets said flag when said predetermined time has elapsed after said mail drop message is received.

7. A selective call radio apparatus according to claim 6, further comprising a timer counting a time after said reception of said mail drop message.

8. A selective call radio apparatus according to claim 1, wherein said control unit controls said display unit to display said mail drop message corresponding to said specified mail drop selective call number in a predetermined display attribute when a predetermined time has elapsed after the reception of said mail drop message.

9. A selective call radio apparatus according to claim 8, wherein said predetermined display attribute is a color inversion display attribute.

10. A selective call radio apparatus according to claim 8, wherein said predetermined display attribute is addition of a special symbol.

11. A selective call radio apparatus according to claim 8, wherein said predetermined time is variable.

12. A method of displaying a message, comprising the steps of:

specifying one of mail drop selective call numbers; and displaying a mail drop message corresponding to said specified mail drop selective call number based on an elapsed time from reception of said mail drop message.

13. A method according to claim 12, wherein said displaying step includes:

comparing a present time and a reception time of said mail drop message; and displaying said mail drop message corresponding to said specified mail drop selective call number based on the comparing result.

14. A method according to claim 13, further comprising the step of:

storing said mail drop message in a memory together with said reception time.

15. A method according to claim 12, wherein said displaying step includes:

referring to a flag for said mail drop message, said flag indicating whether a predetermined time has elapsed after said mail drop message is received; and displaying said mail drop message corresponding to said specified mail drop selective call number based on the referring result.

16. A method according to claim 15, further comprising the step of:

storing said mail drop message in a memory together with said flag.

17. A method according to claim 15, further comprising the step of:

initializing said flag when said mail drop message is received; and setting said flag when said predetermined time has elapsed after said mail drop message is received.

18. A method according to claim 12, wherein said displaying step includes displaying said mail drop message corresponding to said specified mail drop selective call number in a predetermined display attribute when a predetermined time has elapsed after the reception of said mail drop message.

19. A method according to claim 18, wherein said predetermined display attribute is a color inversion.

20. A method according to claim 18, wherein said predetermined display attribute is addition of a special symbol.

21. A method according to claim 18, wherein said predetermined time is variable.

* * * * *